United States Patent Office 3,522,330
Patented July 28, 1970

3,522,330
POLYMER BLENDS
Charles W. Montgomery, Baton Rouge, La., assignor to Ethyl Corporation, New York, N.Y., a corporation of Virginia
No Drawing. Original application Aug. 28, 1964, Ser. No. 392,912, now Patent No. 3,390,208 dated June 25, 1968. Divided and this application Jan. 8, 1968, Ser. No. 721,897
Int. Cl. C08f *37/18*
U.S. Cl. 260—889                                4 Claims

ABSTRACT OF THE DISCLOSURE

The invention comprises blends of (1) from about 5 to 200 parts of an ethylene/vinylchloride copolymer containing about 10 to 80% ethylene and (2) about 100 parts of polystyrene or butadiene/styrene rubber.

This application is a divisional of application Ser. No. 392,912, filed Aug. 28, 1964, now U.S. Pat. 3,390,208.

The present invention concerns blends of vinyl chloride-ethylene copolymers with other polymeric materials.

Polystyrene has long been known as a commercial plastic having a wide variety of important properties. However, one of the objectionable features of polystyrene is the flammability of this plastic. Another physical property of polystyrene in which improvement is desired is impact resistance. The major drawback of polystyrene has been its low heat distortion temperature.

Polypropylene is a commercial plastic of increasing importance. It is expected to supplant polyethylene in a number of commercial applications. In comparison to high density polyethylene, polypropylene has better heat resistance, high tensile strength, better resistance to chemicals and solvents, and greater stiffness and hardness. However, its impact strength is usually lower and it becomes brittle at higher temperatures than does polyethylene. It is less resistant to oxidation than is polyethylene.

Polyethylene has been found to have rather poor resistance to sunlight, low oxygen resistance, and a tendency to stress-crack particularly when in contact with aqueous media. In addition, the impact resistance of polyethylene renders it unsuitable for some commercial applications.

In addition to the foregoing undesirable features the above mentioned plastics all suffer from the disadvantage of being flammable. Various additives and blending agents have been incorporated in these plastics to decrease or modify their flammability. However, such agents are usually expensive and cause the plastic material to have other undesirable properties.

Certain of the commercial rubber products, e.g. SBR, Butyl rubber and EPR (ethylene-propylene copolymer rubber) do not have sufficient heat resistance, abrasion resistance, oil resistance, and non-flammability to render them suitable for certain commercial applications.

It is an object of this invention to provide a plastic material composed of a blend of polystyrene and vinyl chloride-ethylene copolymer, which material has an improved impact resistance and low flammability.

It is a further object of this invention to provide a plastic material composed of a blend of polypropylene and a vinyl chloride-ethylene copolymer, which material has improved impact strength and low flammability.

It is also an object of this invention to provide a plastic material composed of a blend of polyethylene and a vinyl chloride-ethylene copolymer, which material has improved resistance to oxygen permeation, stress-cracking, has high impact strength, and has low flammability.

It is a still further object of this invention to provide rubber compositions composed of a blend of synthetic rubber and a vinyl chloride-ethylene copolymer. These rubber compositions have improved heat, abrasion, oil, and flame resistance.

In accordance with the present invention, it has been found that the physical properties of polystyrene, polypropylene, polyethylene, and rubber materials may be substantially improved by blending each of the foregoing materials with a vinyl chloride-ethylene copolymer containing from about 10 to about 80 percent weight ethylene.

The vinyl chloride-ethylene copolymers that are useful in preparing the blends of the present invention may be prepared using a number of different polymerization techniques and catalysts. A particularly suitable vinyl chloride-ethylene copolymer can be made of polymerizing vinyl chloride and ethylene in the presence of a catalyst which is the product of a reaction of an organoborane with either molecular oxygen or peroxides. The polymerization is preferably carried out at a temperature in the range of from about $-25°$ C. to about $10°$ C. and at a pressure from about 500 to about 50,000 p.s.i. The preferred vinyl chloride-ethylene copolymer produced using the foregoing catalyst should have an inherent viscosity of about 0.9. Such a copolymer has been found to impart the desirable characteristics to the other polymeric material in the blend. Procedures for preparation of suitable vinyl chloride-ethylene copolymers made with an organoborane-oxygen catalyst are set forth in copending U.S. patent applications Ser. No. 235,545; filed Nov. 5, 1962, for "Copolymer Compositions" now abandoned, and Ser. No. 251,071; filed Jan. 14, 1963, for "Elastomeric Compositions," now abandoned, which applications are assigned to the same assignee as the present application.

The vinyl chloride-ethylene copolymer may also be produced using a different type of "free radical" catalyst system. An alternate catalyst system can be prepared from a mixture of (a) an oil soluble derivative of a transion metal in an oxidation state which is capable of reducing a peroxide linkage to produce free radicals, and (b) a water insoluble but oil soluble peroxide compound. The preferred transition metal compounds is selected from salts of carboxylic acid and the preferred peroxide compound is an alkyl peroxide or hydroperoxide. However, acyl peroxides, aryl peroxides, and aralkyl hydroperoxides are also suitable for use. A procedure for the preparation of suitable vinyl chloride-ethylene copolymers made with the transition metal compound-peroxide catalyst system is set forth in copending U.S. patent application Ser. No. 340,801; filed Jan. 28, 1964, for "Copolymerization Process," now abandoned, which application is assigned to the same assignee as the present invention.

The vinyl chloride-ethylene copolymers most suited for use in preparing the blends of the present invention are those copolymers containing from about 10 to about 80 percent weight ethylene. A more preferred composition for the vinyl chloride-ethylene copolymers is from about 10 to about 40 percent weight ethylene. The copolymers containing higher percentages of vinyl chloride have been found to impart higher degrees of flame resistance to the polymer blends of the present invention. However, it has been found that when the copolymers of vinyl chloride and ethylene contain less than about 5 percent weight ethylene they are not fully compatible with the polymeric materials used in preparing the blends of the present invention. To provide the necessary compatibility between the vinyl chloride-ethylene copolymer and the polymers used in preparing the blends, one should utilize a copolymer having greater than about 5 percent weight ethylene in the copolymer.

The relative proportions of vinyl chloride-ethylene copolymer and polymer material used in preparing the blends of the present invention may vary over a wide proportion, depending upon the physical properties desired in the final blend. In general, from about 5 to about 200 parts of the vinyl chloride-ethylene copolymer may be utilized per 100 parts of the particular polymers. A more preferred range is from about 5 to about 100 parts of the vinyl chloride-ethylene copolymer per 100 parts of the polymer. A still more preferred composition range is one utilizing from about 5 to about 60 parts of vinyl chloride-ethylene copolymer per 100 parts of polymer when the vinyl chloride-ethylene copolymer contains about 20 percent ethylene. Another preferred range is from about 10 to about 80 parts of vinyl chloride-ethylene copolymer to about 100 parts of polymer when the vinyl chloride-ethylene copolymer contains about 60 percent ethylene, all of the foregoing parts and percentages being by weight.

The polymeric blends of the present invention may be prepared using any suitable mechanical blending apparatus. Banbury mixers or other standard commercial mixing devices may be used to mill the vinyl chloride-ethylene copolymer with the other polymeric component. The mechanically blended substantially uniform polymeric mixture may be calendered into sheets or films or may be processed to produce other structural shapes or forms depending upon the desired and use for the polymer blend.

The polymer blend for the present invention may have added thereto, thermal stabilizers, fillers, dyes, lubricants, antioxidants, and other additives customarily employed to impart certain desired characteristics to the finished product.

The blend of polystyrene with vinyl chloride-ethylene copolymer may be used to fabricate molded parts such as cams, gears, pipe fittings, bobbins, and spools. The blends may also find use in vacuum forming such parts as refrigerator door liners, business machine housings, and tote boxes. Thin gauge sheet may be used for wall tile and letters for signs.

The blends of polypropylene with vinyl chloride-ethylene copolymer may be used to prepare wrapping films, pipe, and bottles. The blend is particularly suited for preparing containers such as bottles or food packages which may be immersed in boiling water without damage. The blend is also suitable for insulating electrical wiring.

The blend of polyethylene and vinyl chloride-ethylene copolymer finds use in preparation of films, coating of electrical wiring, manufacture of squeeze bottles, boxes, pails, pans, pitchers, refrigerator dishes, and pipe.

The rubber blends with vinyl chloride-ethylene copolymer (SBR, Butyl rubber and EPR) find use in a wide variety of applications. They are articularly suitable as substitutes for the more expensive neoprene rubber. Specific uses include hoses, gaskets, vibration damping structures, metal cable sheathing, and electrical cable sheathing. The rubber blends also are suitable for use in manufacture of clothing such as booth, gloves, aprons, hoods, and rain wear.

The polystyrene blends and the rubber blends of the present invention may also be used to prepare foamed structures. Both rigid and flexible foams may be prepared from these blends by selecting both the amount of vinyl chloride-ethylene copolymer incorporated in the blend and the amount of ethylene incorporated in the vinyl chloride-ethylene copolymer.

The following examples provide illustrations of some of the preferred embodiments of the present invention. The examples are merely exemplary and are not intended to limit the scope of the present invention. All parts are by weight.

EXAMPLE I

A mixture of 100 parts polystyrene and 11 parts of a vinyl chloride-ethylene copolymer containing 20 weight percent ethylene was heated and worked on a roll mill for 10 minutes to form a compatible blend. The sheet was stripped from the roll mill and test samples cut therefrom. The samples exhibited a notched Izod impact strength (ASTM D-256) of 0.22 foot pounds. A sample of the blend had a heat distortion temperature (ASTM D-648, 264 p.s.i. stress) of 78° C.

EXAMPLE II

A mixture of 100 parts polystyrene and 60 parts of a vinyl chloride-ethylene copolymer containing about 20 weight percent ethylene was heated and worked on a roll mill for 10 minutes to form a compatible blend. The blend was stripped from the mill and examined for transparency and strength. The sheet was completely transparent and had an extremely high strength with a high degree of toughness. The sheet material was found to be self-extinguishing i.e., the material did burn in air only when heated by an open flame. In contrast, the polystyrene without the copolymer readily supported combustion.

EXAMPLE III

A mixture of 100 parts of SBR rubber (a styrene-butadiene copolymer) and 60 parts of a vinyl chloride-ethylene copolymer which contained 80 percent vinyl chloride was blended by heating and working on a roll mill. The sheet was stripped from the mill roll and examined and found to be extremely strong, tough and elastic. The material exhibited excellent oil resistance and was found to be self-extinguishing. The SBR rubber before blending had very poor oil resistance and readily supported combustion.

EXAMPLE IV

Example III was repeated using a butyl rubber instead of SBR with substantially the same results.

EXAMPLE V

A mixture of 100 parts of polyethylene and 11 parts of a vinyl chloride-ethylene copolymer containing 80 parts of ethylene was blended by heating and working on a roll mill. The sheet was stripped from the roll mill and found to be very strong and highly elastic. Samples cut from the sheet exhibited an ultimate tensile strength (ASTM D-412) of 1120 p.s.i. Another sample was tested and found to have an ultimate elongation of 420 percent. A sample of the polyethylene before blending exhibited a lower ultimate tensile strength and a lower ultimate elongation.

EXAMPLE VI

A mixture of 100 parts of polyethylene and 60 parts of vinyl chloride-ethylene copolymer containing 80 percent vinyl chloride were blended on a roll mill by heating and working. The sheet was stripped from the roll mill and examined and found to be very tough and strong. The material was found to be self-extinguishing. The unblended polyethylene was not nearly as tough and strong and also readily supported combustion.

EXAMPLE VII

Example VI was repeated using polypropylene instead of polyethylene with substantially the same results.

The polystyrene used in preparing the blends with vinyl chloride-ethylene copolymer may be selected from any of the commercially available solid polystyrene molding powders, such as those marketed under the trade name "Styron" by Dow Chemical Company, "Lustrex" by Monsanto Company, or the P series of polystyrenes made by Koppers Company. Both so-called "low-impact" and "high-impact" polystyrene solids may be used in preparing the blends of the present invention.

Suitable SBR rubbers are those produced according to standardized procedures for making GR-S, S-10, X-503 and other styrene-butadiene rubbers. Commercial styrene-butadiene rubbers sold under the trade names "Chemigum," "Hycar OS," "Butapene S," "Nubum," "Philprene," "Polysor S," and "Krylene' are eminently suitable for preparing the blends of the present invention.

Butyl rubbers (isobutylene-isoprene rubber) suitable for use in preparing the blends of the present invention may be any of the commercially available Butyl rubbers, such as the "Polysor" Butyl made by Polymer Corporation. Other Butyl rubbers made by the Standard CR–1 formulae of the U.S. Rubber Reserve are suitable.

Any of the commercial solid polyethylenes are suitable for use in preparing the blends of the present invention. The polyethylene may be either the high density (Phillips, Ziegler or I.C.I.) type or the low density (high pressure) type.

Polypropylene suitable for use in preparing the blends of the present invention may be any of the commercially available solid molding powder polypropylenes, e.g. "Profax" polypropylene.

The nature of the foregoing polymeric materials suitable for use in mixing with vinyl chloride-ethylene copolymers to prepare a substantially homogeneous blend are well known to those skilled in the art. Further details as to the physical and chemical properties of these polymers and methods for their preparation may be found in the following texts: Vinyl and Related Polymers, Calvin E. Schnildknecht, John Wiley and Sons, 1952 Edition; Polyethylene, R. A. V. Raff and J. B. Allison, Interscience Publishers, Inc., 1956; Polymeric Materials, Charles C. Winding and Gordon D. Hiatt, McGraw-Hill Book Company, Inc., 1961; and Polymers and Resins, Their Chemistry and Chemical Engineering, Brage Golding, D. Von Nostrand Company, Inc., 1959.

What is claimed is:

1. A blend of polymeric material comprising a physical mixture of (a) a vinyl chloride-ethylene copolymer containing from about 10 to about 80 percent weight ethylene, and (b) polystyrene, said vinyl chloride-ethylene copolymer being prepared by the copolymerization of vinyl chloride and ethylene monomers.

2. A blend of polymeric material comprising a physical mixture of (a) a vinyl chloride-ethylene copolymer containing from about 10 to about 80 percent weight ethylene, and (b) a styrene-butadiene copolymer rubber said vinyl chloride-ethylene copolymer being prepared by the copolymerization of vinyl chloride and ethylene monomers.

3. A blend of polymeric material comprising a physical mixture of (a) from about 5 to about 200 parts of a vinyl chloride ethylene copolymer containing from about 10 to about 80 percent weight ethylene, and (b) about 100 parts of polystyrene, said vinyl chloride-ethylene copolymer being prepared by the copolymerization of vinyl chloride and ethylene monomers.

4. A blend of polymeric material comprising a physical mixture of (a) from about 5 to about 200 parts of a vinyl chloride-ethylene copolymer containing from about 10 to about 80 percent weight ethylene, and (b) about 100 parts of a styrene-butadiene copolymer rubber, said vinyl chloride-ethylene copolymer being prepared by the copolymerization of vinyl chloride and ethylene monomers.

References Cited

UNITED STATES PATENTS

| 2,844,573 | 7/1958 | Gluesenkamp et al. | 260—897 |
|---|---|---|---|
| 2,919,252 | 12/1959 | Canterino | 260—889 |
| 3,014,887 | 12/1961 | Howard | 260—4 |
| 3,227,781 | 1/1966 | Klug et al. | 260—897 |
| 3,248,375 | 4/1966 | Erbaugh | 260—87.5 |
| 3,390,208 | 6/1968 | Montgomery | 260—897 |

MURRAY TILLMAN, Primary Examiner

M. J. TULLY, Assistant Examiner

U.S. Cl. X.R.

260—2.5, 87.5, 897